Figure 1:
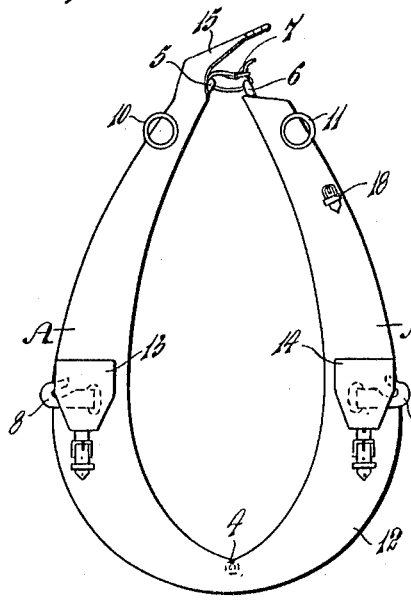

R. R. STEWART.
COMBINED HAMES AND COLLAR.
APPLICATION FILED JAN. 22, 1913.

1,114,929.

Patented Oct. 27, 1914.

Witnesses:
Charles B. Crompton
John A. Percival

R. R. Stewart.
Inventor.
By G. Croydon Marks
Attorney.

UNITED STATES PATENT OFFICE.

RAMSAY ROBERT STEWART, OF WAIHOLA, NEW ZEALAND.

COMBINED HAMES AND COLLAR.

1,114,929.  Specification of Letters Patent.  Patented Oct. 27, 1914.

Application filed January 22, 1913. Serial No. 743,429.

*To all whom it may concern:*

Be it known that I, RAMSAY ROBERT STEWART, a citizen of the Dominion of New Zealand, and residing at Waihola, in the Provincial District of Otago, in the Dominion of New Zealand, have invented certain new and useful Improvements in Combined Hames and Collars, of which the following is a specification.

According hereto, a horse collar is comprised of metal hames permanently combined with a frame stuffed collar of approximately the usual construction. The hames are of steel in two parts hinged together at the bottom and built into the collar as a fixture, a leather casing being employed through which the pull bars and rein rings project. Flaps upon the cover prevent rain from getting into the stuffing.

The invention is illustrated in the drawing wherein:—

Figure 3:
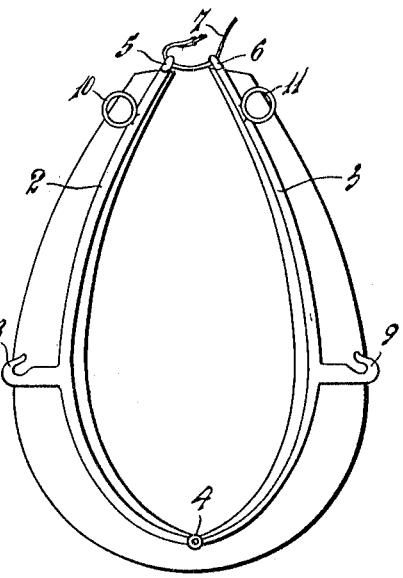
Figure 2:
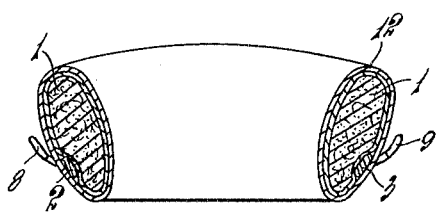
Figure 4:
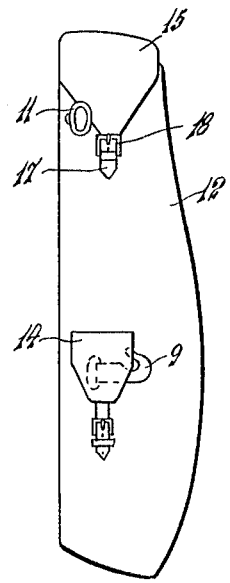

Figure 1, is a front elevation, Fig. 2, a sectional plan on A—A, Fig. 1. Fig. 3, a similar view to Fig. 1 but with the leather cover removed. Fig. 4 is a side elevation.

The collar is framed in the ordinary manner with straw, stuffing or the like 1. The hames in two members 2 and 3 are hinged together at their lower ends 4, and at their upper ends are each furnished with a ring, 5 and 6 respectively, through which a strap 7 is passed for the purpose of holding them together. The hames are shaped approximately to the curve of the front of the collar as shown in Fig. 2, and have integrally formed pull bars 8 and 9 and rein rings 10 and 11. A cover 12 of leather is drawn tightly over the hames and frame and secured by sewing to the usual back leather of the collar in the ordinary way. The pull bars pass through holes in the leather cover and flaps 13 and 14 upon each side of the cover prevent the entrance of rain to the stuffing. The rein rings also pass through holes in the cover, the holes being closely sewn to make a weather tight joint. A cover flap 15 upon the top of one side of the collar is adapted to fold over the other part for the purpose of excluding rain. It is secured in position by a strap 17 which is engaged in a buckle 18.

What I do claim and desire to secure by Letters Patent of the United States is:—

A horse-collar, including a stuffed frame, hames with their respective members hinged together at their lower ends, said hames-members being embedded within said stuffed frame and having integral tug or pull bars, also integral terret-members, said pull bars and terret-members extending beyond said stuffed frame, a leather cover secured to the back-leather of the collar, and tightly drawn over said stuffed frame and hames, said pull-bars and terret-members extending through openings provided in said leather-cover, said leather-cover being provided with flaps overlying said pull-bars and the openings in said leather cover through which said pull-bars extend, and fastening means between the upper free ends of said hames-members, the upper end of one side of the cover having an integral extension adapted to be connected to the upper end of the opposite side of said cover and overlying the fastening means between the upper ends of the hames.

In testimony whereof I have signed my name to this specification in the presence of two witnesses.

RAMSAY ROBERT STEWART.

Witnesses:
 WILLIAM JAMES ANDERSON,
 SAMUEL PHILIP MORAIN.

---

Copies of this patent may be obtained for five cents each, by addressing the "Commissioner of Patents, Washington, D. C."